United States Patent [19]
Rink et al.

[11] Patent Number: 5,746,793
[45] Date of Patent: May 5, 1998

[54] REINFORCED CERAMIC AIR BAG FILTERS

[75] Inventors: Linda M. Rink, Liberty; Guy R. Letendre, Ogden, both of Utah; Alexander Teverovsky, Concord, Mass.; George C. Marjanski, Riverdale, Utah

[73] Assignee: Morton International, Inc., Chicago, Ill.

[21] Appl. No.: 586,044

[22] Filed: Jan. 16, 1996

[51] Int. Cl.⁶ .................................................. B01D 39/20
[52] U.S. Cl. .................. 55/385.3; 55/487; 55/523; 280/740; 280/742; 422/167
[58] Field of Search ................................. 55/385.3, 486, 55/487, 523; 422/164, 167, 305; 280/729, 736, 738, 740, 741, 742

[56] References Cited

U.S. PATENT DOCUMENTS

| | | | |
|---|---|---|---|
| 2,995,088 | 8/1961 | Asplund | 102/202 |
| 3,853,332 | 12/1974 | Lynch | 280/740 |
| 3,912,458 | 10/1975 | Fukuma et al. | 422/167 |
| 3,950,263 | 4/1976 | Fukuma et al. | 252/193 |
| 4,265,659 | 5/1981 | Blome | 75/407 |
| 4,316,874 | 2/1982 | Kasama et al. | 422/126 |
| 4,568,595 | 2/1986 | Morris | 428/116 |
| 4,629,483 | 12/1986 | Stanton | 55/487 |
| 4,732,594 | 3/1988 | Mizrah et al. | 55/523 |
| 4,810,273 | 3/1989 | Komoda | 55/523 |
| 4,846,906 | 7/1989 | Helferich et al. | 156/89 |
| 4,865,635 | 9/1989 | Cuevas | 55/276 |
| 4,965,101 | 10/1990 | Frei et al. | 427/255 |
| 4,976,760 | 12/1990 | Helferich et al. | 55/487 |
| 5,000,479 | 3/1991 | Werner et al. | 280/736 |
| 5,064,459 | 11/1991 | Unterforsthuber | 55/512 |
| 5,071,457 | 12/1991 | Schmidt, Jr. | 55/523 |
| 5,075,160 | 12/1991 | Stinton et al. | 428/282 |
| 5,196,120 | 3/1993 | White | 210/504 |
| 5,204,068 | 4/1993 | O'Loughlin | 422/180 |
| 5,215,721 | 6/1993 | Tasaki et al. | 422/165 |
| 5,230,726 | 7/1993 | Smith et al. | 55/487 |
| 5,346,254 | 9/1994 | Esterberg | 280/741 |
| 5,351,619 | 10/1994 | Chan et al. | 102/289 |
| 5,364,586 | 11/1994 | Trusov et al. | 419/2 |
| 5,368,329 | 11/1994 | Hock | 280/741 |
| 5,372,380 | 12/1994 | Duffy et al. | 280/740 |
| 5,374,407 | 12/1994 | Decker et al. | 422/305 |
| 5,378,015 | 1/1995 | Rink et al. | 280/736 |
| 5,466,420 | 11/1995 | Parker et al. | 280/740 |
| 5,503,806 | 4/1996 | Fulmer et al. | 280/736 |
| 5,547,638 | 8/1996 | Rink et al. | 280/736 |
| 5,556,439 | 9/1996 | Rink et al. | 55/523 |
| 5,564,741 | 10/1996 | Ward et al. | 280/740 |
| 5,582,427 | 12/1996 | Rink et al. | 280/740 |

FOREIGN PATENT DOCUMENTS

| | | |
|---|---|---|
| 0626295 | 11/1994 | European Pat. Off. |
| 640515 | 3/1995 | European Pat. Off. ........ 280/736 |
| 0640515 | 3/1995 | European Pat. Off. |
| 50-48797 | 5/1975 | Japan . |
| 61-149221 | 7/1986 | Japan ........ 55/523 |
| 2-169007 | 6/1990 | Japan ........ 55/523 |
| 4-2542 | 1/1992 | Japan ........ 280/736 |
| 1632484 | 3/1991 | U.S.S.R. . |
| 9427842 | 12/1994 | WIPO . |
| 9610453 | 4/1996 | WIPO . |

*Primary Examiner*—Duane S. Smith
*Attorney, Agent, or Firm*—Taylor J. Ross; Gerald K. White

[57] ABSTRACT

Reinforced ceramic unitary filters for air bags. The filters have a first layer having a high porosity, and a second layer having a low porosity. The first layer is preferably formed of low-cost ceramic grit sintered into a rigid mass, or a rigid reticulated ceramic. The second layer is formed of metal particles, and provides increased strength for the brittle ceramic. The metal particles may be formed onto the second layer and then sintered in place. Alternatively, the second layer may be formed separately and secured in position on the first layer. As a third alternative, the second layer may be applied by plasma arc deposition upon the first layer. The metal particles provide increased strength to the filter, as well as providing a fine filtering layer. The metal layer can also place the ceramic in compression to pre-load the ceramic layer for increased resistance to breakage.

19 Claims, 2 Drawing Sheets

1

REINFORCED CERAMIC AIR BAG FILTERS

BACKGROUND OF THE INVENTION

1. Field of the Invention

The present invention relates in general to filters for pyrotechnic air bag restraint modules. In particular, the present invention relates to improved unitary, monolithic filters for such modules.

2. Description of the Related Art

Pyrotechnic air bag restraint modules are well known, and generally include an inflator connected to a cushion. The cushion is inflated by generation of gas by a material stored within the inflator housing. With most commonly used gas generant materials, however, an undesirable amount of solids are produced during gas generation, and as such a filter is provided within the housing to reduce the solids to an acceptable level. The filter also serves as a heat sink to cool the gas, which may be extremely hot.

While various shapes and sizes of filters are known, two of the most common filter shapes are referred to as disk and tubular herein. The disk filters are planar elements with a circular periphery, and are commonly employed in axial flow inflators. The second type, tubular, take the form of a length of hollow tube. Both of these filters have typically been formed of multiple layers of various filtering materials such as wire mesh and ceramic paper.

Such multi-layer filters are difficult and expensive to produce and install, especially in the case of tubular filters. To avoid these disadvantages, there have been various attempts to provide an air bag filter in the form of a unitary element which may be easily mass produced and easily installed in the housing. Unitary filters must of course withstand the intense heat and pressure associated with a pyrotechnic air bag. To withstand the heat, it has been proposed to form a filter from agglomerated ceramic particles or grit. An example of this is shown in Japanese Kokai 50-48797, published May 1, 1975.

These ceramic filters are very heat resistant, and are also very strong in compression. However, they are quite weak in tension. As such, ceramics are useful for the disk filters which are placed almost entirely in compression, but are not suited to tubular filters, where large hoop stresses are generated.

Various other exotic materials have been proposed, such as reticulated carbon foam with a metallic coating, as shown in U.S. Pat. No. 5,372,380 to Duffy et al. While such materials may provide the desired heat and pressure resistance, they are expensive to produce.

SUMMARY OF THE INVENTION

An object of the present invention is to provide a filter for an air bag which is simple and inexpensive to produce, and easy to install.

Another object of the present invention is to provide such a filter which will withstand the heat and pressure of air bag activation, while providing the desired filtering.

A further object of the present invention is to provide a filter material with sufficient strength that it may be employed as the exterior housing for the inflator.

These and other objects are achieved by reinforced ceramic unitary filters for air bags. The filters have a first layer having a high porosity, and a second layer having a low porosity. The first layer is preferably formed of low-cost ceramic grit sintered into a rigid mass, or a rigid reticulated ceramic. The second layer is formed of metal particles, and provides increased strength for the brittle ceramic. The metal particles may be formed onto the second layer and then sintered in place. Alternatively, the second layer may be formed separately and secured in position on the first layer. As a third alternative, the second layer may be applied by plasma arc deposition upon the first layer. The metal particles provide increased strength to the filter, as well as providing a fine filtering layer. The metal layer can also place the ceramic in compression to pre-load the ceramic layer for increased resistance to breakage.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

The present invention is primarily concerned with the constituents and internal structure for unitary filters for air bags and other pyrotechnic inflation devices. To better describe the invention, therefore, a few of the more common final shapes for filters and inflators are initially noted.

Figure 1:
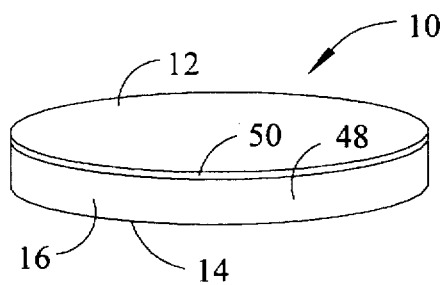
FIG. 1 is a perspective view of a disk filter according to a first embodiment of the present invention.
Figure 2:
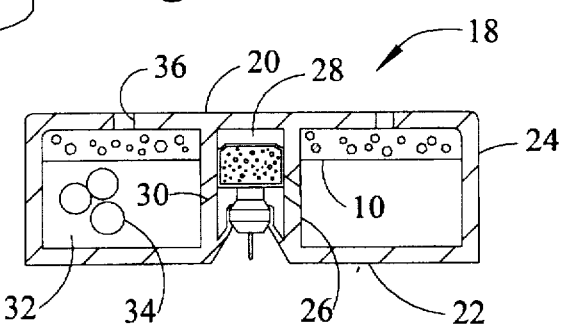
FIG. 2 is a cross-sectional view of a driver side inflator using the filter of FIG. 1.

With reference to FIG. 1, a disk filter according to the present invention is generally designated by reference numeral 10. The filter 10 is appropriately in the form of a disk, with circular upper and lower faces 12 and 14, respectively, and a peripheral sidewall 16. Disk filters are typically employed in a driver side air bag inflator having a cylindrical shape, as shown in FIG. 2 and referenced generally as 18.

The inflator 18 includes top and bottom walls 20 and 22, joined together by a peripheral sidewall 24. Within the confines of these walls, there is a tubular inner wall 26 which defines an initiator cavity 28 containing a first pyrotechnic material. A set of gas ports 30 extend through the inner wall 26 to an annular generant chamber 32 defined between the inner wall and the peripheral sidewall 24. This generant chamber houses a second pyrotechnic material 34, typically referred to as generant, which produces the majority of the gas used to fill the cushion (not shown) of the air bag.

The filter 10 is mounted in the generant chamber 32, between the top wall 20 and the generant 34. The top wall 20 includes a set of exit ports 36 from which the gas generated by the generant may leave the inflator. As may be seen, this gas must pass through the disk filter 10 before exiting from the ports 36. The filter thus may remove particulate materials from the gas and cool the gas.

Figure 4:
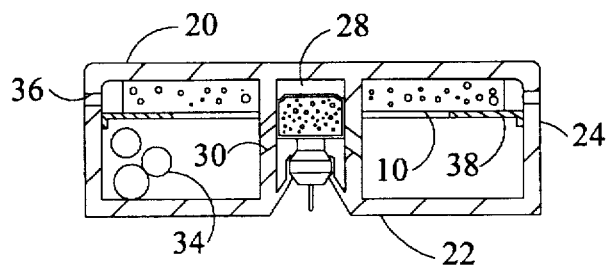
FIG. 4 is a cross-sectional view of a driver side inflator using the filter of FIG. 3.

A slight variation of this arrangement is shown in FIG. 4, where like reference numerals denote like elements. In this driver side inflator, the only difference is the location of the exit ports 36, which extend through the side wall 24. The ports are located, however, such that the gas must pass through the filter before exiting the ports. To ensure a sufficient passage through the filter to provide particulate removal and cooling, a barrier 38 may be provided between the generant and the filter adjacent the ports. The barrier will force the gas to the radially inward portion of the filter, causing the gas to pass through a sufficient portion of the filter to cause cooling and filtering. Additionally, the filter in this arrangement may be sealed at its upper face 12 to prevent passage of the gas between the filter and the top wall 20 of the inflator. This sealing may be by known sealant compounds, or a layer of ceramic slurry formed of alumina, silica or zirconia.

Figure 5:
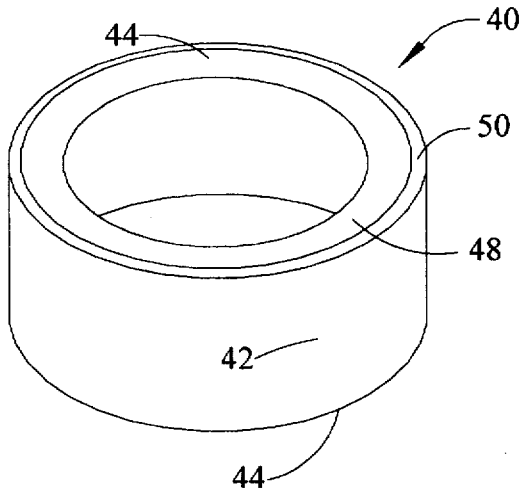
FIG. 5 is a perspective view of a tubular filter according to a further embodiment of the present invention.

A second common filter type, a tubular filter, is shown in FIG. 5, and is designated by reference numeral 40. The tubular filter takes the form of a section of a tube, with a sidewall 42 bounded by longitudinal ends 44. The tubular filter is commonly used in both driver side and passenger side inflators, with appropriate changes in the proportions and size of the tube.

Figure 6:
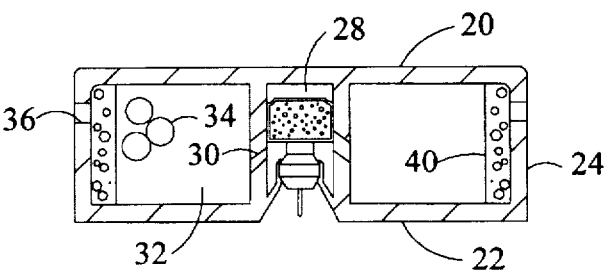
FIG. 6 is a cross-sectional view of a driver side inflator using the filter of FIG. 5.

A driver side inflator is shown in FIG. 6, and includes many of the same elements as in the inflators of FIGS. 2 and 4. The difference here is that the tubular filter extends about the inner face of the sidewall 24, such that it is between the generant 34 and the side wall containing the exit ports. A typical passenger inflator is similar in form to the driver inflator of FIG. 6, but with a few differences. First, passenger side inflators are typically longer. Also, there is typically not a rigid inner wall 26 surrounding the initiator chamber 28, but instead simply a foil wrapping.

There are of course many variations within the prior art inflators. While all the variation is too great to list here, one variation is of particular application for unitary filters according to the present invention, and that is a filter housing.

Figure 7:
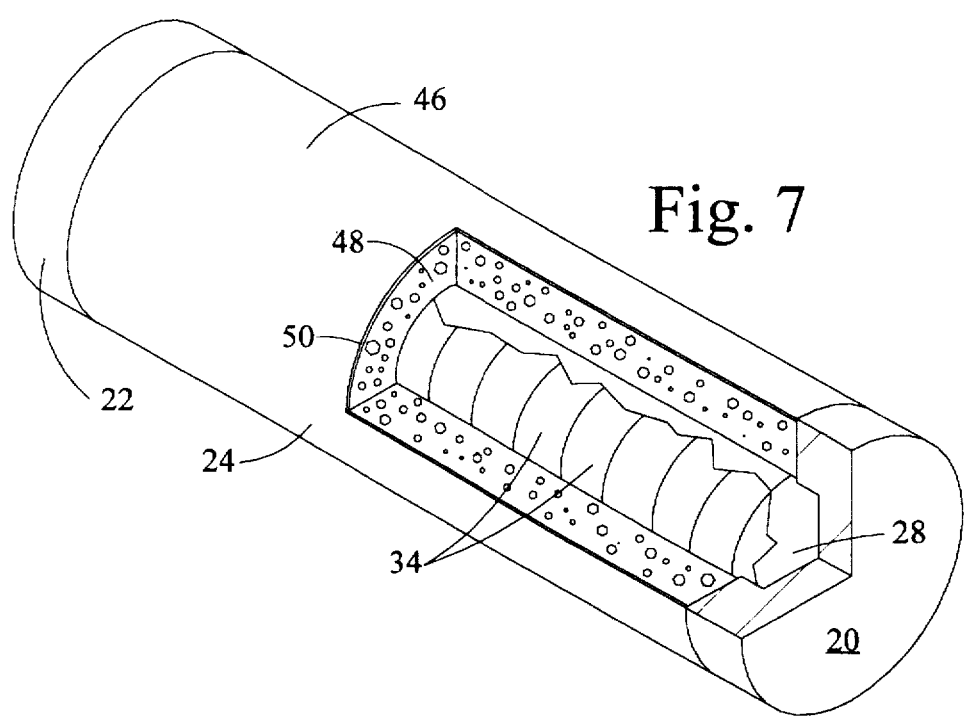
FIG. 7 is a perspective view of a passenger side inflator in which a filter according to the invention forms a portion of the housing.

As shown in FIG. 7 for a passenger side inflator, a portion (or all) of the housing (top wall, bottom wall, sidewall) may be formed of the unitary filter material, thus combining the function of the filter and the structural housing into a single component. In the example shown, the typical sidewall of the inflator has been replaced with a filter sidewall 46 formed from a tubular filter. The housing is completed by the top and bottom walls (usually referred to as end caps for passenger side inflators) which may be secured to the filter side wall in a variety of known ways. With appropriate changes this same principle may be used in driver side inflators also. As such, the filters according to the present invention may be used within the inflator housing, or form at least a portion of the housing.

While these various examples of final filter forms or shapes, and their use in various inflator types, have been specifically shown, it should be understood that the materials set forth below may be shaped into other arrangements suitable for pyrotechnic inflation devices, and still remain within the scope of this invention.

The particular constituents of the present filters will now be discussed in greater detail. For each of the filters according to the present invention, there will be two main layers. These consist of a first layer 48, typically at the upstream or entrance face of the filter, and a second layer 50, typically at the downstream or exit face of the filter. While these layers may be further subdivided into plural sub-layers, the general form of first and second layers will hold for each embodiment of this invention.

Keeping in mind the two basic forms of filters, disk and tubular, the most common arrangements of the two layers are discs and tubes. For example, for the filter of FIG. 1, the overall shape is a disc, and the gas flow is along the longitudinal axis. As such, the first layer and second layer both take the form of a disc, with the first layer being on the bottom, adjacent the generant, and the second layer on top adjacent the exit ports.

Figure 3:
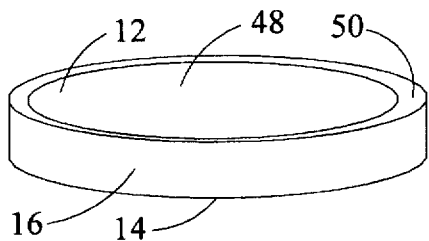
FIG. 3 is a perspective view of a disk filter according to a second embodiment of the present invention.

For the filter of FIG. 3 the overall shape is again a disc, however, while the gas flow begins longitudinally, it exits radially, as required for the inflator of FIG. 4. As such, the first layer takes the form of a central disc, while the second layer is tubular and placed at the side wall of the filter. Finally, for the tubular filters of FIGS. 5 and 7, the gas flow is fully radial, and the first layer takes the form of a radially interior tube, with the second layer forming a radially exterior tube.

As noted above, and as is common in the art, the first layer will have a generally large porosity, and will function mainly to cool the gas. The second layer will have a lower porosity, and will function mainly to remove the particulates. There is of course some filtering in the first layer and some cooling in the second layer.

The first layer could be formed of a variety of materials. While metals are feasible, it is preferred that ceramics be employed due to their low cost. The ceramics may be in the form of bonded ceramic particles 52 (FIG. 8), or a reticulated foam 54 (FIG. 9).

To form the first layer from bonded particles 52, a loose mass of these particles (typically with a vitreous binder mixed therein) are formed together into the form of the filter (i.e., disk, etc.). This mixture, having a consistency similar to wet sand, is molded to a form at least approximating the final desired shape. This may be effected by extrusion of the mixture, isostatic compression, or pressing in a mold or form, to produce a preform or green. The green is then treated (as by simple drying, calcining and/or sintering) to produce the solid, strong unitary filter.

The particle sizes may vary, depending upon the desired porosity of the first layer. For most uses, particles within the range of about 0.053" (1.35 mm, or 10 mesh) to 0.012" (0.30 mm, or 50 mesh) are acceptable. Various ceramic materials may be employed for the particles, such as silicon carbide, alumina, etc.

With regard to the reticulated ceramic foam, a sacrificial foam, typically open-celled polyurethane, is immersed in, or otherwise coated with, a ceramic slurry, for example formed of silica, zirconia or alumina. The ceramic material is allowed to dry, and thereafter the ceramic coated sacrificial foam is heated to burn out the polyurethane sacrificial foam, leaving behind the ceramic material in the form of the reticulated foamed ceramic 54. Ceramic foams 54 having a porosity in the range of 10–70 pores per inch will typically be acceptable for the first layer.

For either material, the ceramic will provide adequate thermal and filtering properties. However, as is known in the art, these ceramics are not strong in tension. As such, the forces of the gas production which place the filter in tension may tend to break the ceramic filter material, reducing its effectiveness. This is especially true for the tube filters, which are subject to hoop stresses upon generation of the gas.

To overcome this problem, the second layer 50 of the present invention provides added strength to the filter. The second layer 50 is formed of metal, and provides a strong layer serving to reinforce the brittle first layer, in addition to filtering and cooling.

The second layer is an agglomeration of metal particles 56. The particle sizes may vary, depending upon the desired porosity of the first layer. For most uses particles within the range of about 0.053" (1.35 mm, or 10 mesh) to 0.012" (0.30 mm, or 50 mesh) are acceptable. Various metals may be used for the particles 56, so long as the melting point of the metal is greater than that expected to be encountered in the inflator. Some suitable metals are stainless steel, carbon steel, aluminum and nickel.

There are three different methods used to form the second layer of metal particles. The first two methods involve forming a mass of the particles into the desired shape and then sintering the particles. The difference between these first two methods is whether the particles are formed in to their shape on or off of the first ceramic layer. The third method of making the metal second layer is plasma arc deposition.

Not all methods may be used with all filter forms. Specifically, if the second layer is formed as a planar disk, as in FIG. 1, the green must be formed directly upon the first layer, either by pressing the mass of particles prior to sintering, or by plasma arc deposition. If the second layer is in the form of a tube, however, any of the three processes may be used. The reasons for this will be explained more fully below.

The first method of making the metal second layer is pressing of the metal second layer particles directly upon the first layer. As noted above, the first layer may be a ceramic foam or a ceramic aggregate. In general, for either material, the first layer is placed within an appropriate mold. Thereafter a mass of the metal particles are also placed in the mold, and compressed. This compression forces the metal particles into their form as a green. The particles will then retain their shape, either by use of a binder, or simply due to the compression if it is sufficiently great. Additionally, this compression can secure the green to the first layer.

Figure 8:
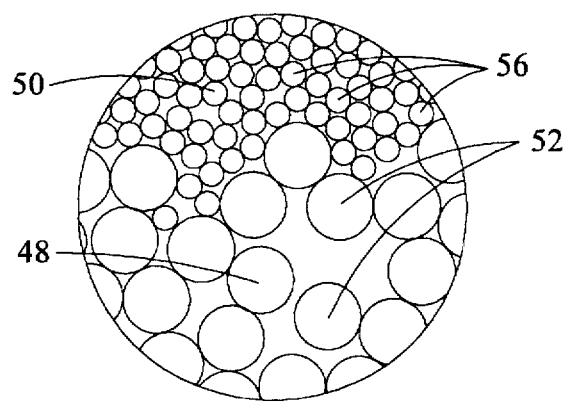
FIG. 8 is an enlarged detail representation of an aggregate/particle configuration according to the present invention.
Figure 9:
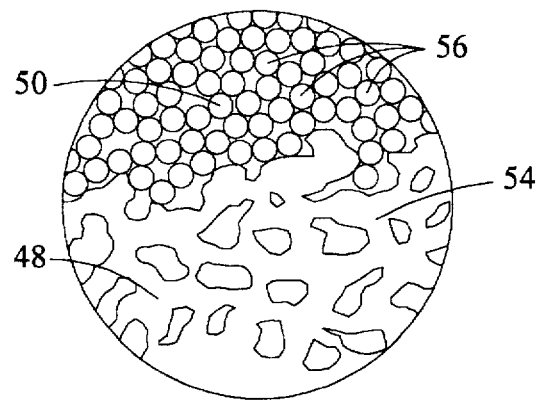
FIG. 9 is an enlarged detail representation of a foam/particle configuration according to the present invention.

With reference to FIG. 8, there is shown an expanded representation of the sintered ceramic aggregate 52 of first layer 48 and the metal particles 56 of the second layer 50. As may be seen, if the sizes of the ceramic particles are sufficiently larger than the metal particle sizes, the particles 56 can be forced into the interstices of the first layer. This contact between the ceramic and metal, especially if a binder is used, serves to hold the second layer to the first. Additionally, forcing the metal into the tortuous interstices can cause numerous interference connections, which further serve to secure the second layer to the first. This is especially true after sintering.

In a similar manner, FIG. 9 shows an expanded representation of the reticulated carbon foam first layer 48, and the metal particles of the second layer 50. Here, again, if the ceramic pores are sufficiently larger than the metal particles, the particles 56 can be forced into the pores. This results in contact and interference connections as with the example above.

Once the green has been formed directly upon the ceramic first layer, the combination of the first and second layers are sintered. This is performed at a suitable temperature for the metal, rather than the previously formed ceramic first layer. This sintering step serves to firmly secure the particles to each other to complete the second layer, as well as further securing the metal second layer to the ceramic first layer.

The second method of forming the metal second layer will now be described. This process is believed to be the same regardless of whether the first layer is the ceramic foam, or the ceramic aggregate. It is this process which is not believed to be suitable for planar layers, but only for tubular, as described below.

In this process, the first layer 48 is formed and sintered, as before. Thereafter, a mass of metal particles are pressed together in a mold to form the tubular second layer green. This pressing is done without the first layer, so that the green contains only the metal of the second layer. During this forming, the inner diameter of the second layer 50 is sized to just fit over the outer diameter of the disk or tubular first layer 48, similar to a close sliding fit. The second layer green is then sintered.

Thereafter (possibly immediately upon completion of the sintering of the second layer), the tubular second layer 50 is slid over the outer diameter of the first layer 48. Since the metal of the second layer has a greater coefficient of thermal expansion than the ceramic first layer, the second layer shrinks more than the first layer during cooling. As such, this creates an interference fit which secures the second layer to the first. Additionally, this greater contraction of the second layer 50 will place the first layer 48 in compression. This serves to pre-load the ceramic first layer, increasing the tensile load it may bear.

A somewhat similar effect may be achieved upon sintering the green second layer on the ceramic first layer according to the first process. Specifically, upon cooling the tubular second layer will contract upon the inner first layer to place it in compression. This effect may be enhanced by maintaining pressure upon the second layer 50 during the sintering process.

As may be seen, in the second method this contraction effect is used to securely retain the tubular second layer upon the disk or tubular second layer. It should also be apparent that this contraction can not be used to reliably secure the planar second layer of FIG. 1. Specifically, while there could be some increased interference and compression of the first layer via the interference created during initial pressing, this would be minimal, and would not serve to adequately maintain the two layers together.

In addition to the two methods discussed above, there is the third method of providing the second layer of metal particles. This is plasma arc spraying, also known as flame spray deposition. In flame spray deposition, a powder, typically metallic, is introduced into the arc of a torch. The particles are propelled toward the deposition surface by the torch, and at the same time heated. This heating is sufficient to cause the metal particles to bond to the deposition surface (and each other), but does not cause a true melting of the particles. As such, the deposition surface receives a coating of fine particles.

As used in the invention, the first, ceramic, layer is initially formed and sintered. Thereafter, standard plasma arc spraying equipment is employed to provide a thin coating of metal particles upon the first layer, thus forming the second metal layer. As is known in plasma arc deposition, the filter may be rotated, reciprocated, or otherwise moved during the deposition process to provide a uniform coating.

While the equipment and process are standard, there are limits upon the powder deposited. In particular, the powder is a metal which has a melting point sufficiently high that the final metal layer will survive the temperatures generated during operation of the inflator. Typical metals which may be employed are stainless steel, carbon steel, aluminum and nickels.

The size of particles used may be the same as with the sintered powder, namely within the range of about 50–200 microns. The particles are applied by this process in a random manner, which is essentially the same as that depicted in FIGS. 7 and 8, although possibly with less intermingling. Several passes of the arc over the first layer may be required to achieve a sufficient thickness. The final thickness will depend upon a variety of factors, including: porosity of the first, ceramic, layer; strength of the first, ceramic, layer; metal particle size; and desired final porosity. In general, the particles will be applied in a thickness sufficient to provide the strength necessary to support the first layer, and to provide a desired final porosity for the completed filter.

For each of the methods described above (i.e., sintered powder metal layer or plasma arc metal layer), it is preferred that the final (i.e., inner and outer layers combined) filter have a porosity of about 2–15 CFM/sq. ft. of filter surface area at a pressure of ½" of water. This may of course be achieved by various combinations of first layer porosities and second layer porosities. So long as adequate cooling, adequate filtration, and a porosity in this 2–15 CFM range is provided, the particular porosity of any individual layer (or sub-layer) is not critical.

While the above arrangements are acceptable, it possible to make modifications to the first layer 48 of the ceramic aggregate 52 and still practice the present invention. The possible modifications may make the first layer 48 stronger and/or provide better gas diffusion. Even if made stronger, however, the second layer 50 is still applied.

In a first modification, two different ceramic aggregate sizes are mixed uniformly, typically with an appropriate and known binder, in a manner similar to that used above for a single aggregate size. Within this first arrangement, there are two possible examples. In the first example, the aggregate sizes may be characterized as large grits and small grits, respectively, with the large aggregate being from about 0.053–0.028" (1.35–0.70 mm, or 10–25 mesh), and the small aggregate being about one-third to one half the size of the large grit, or about 0.030–0.012" (0.750–0.30 mm, or 20–50 mesh). It is noted that, even though the noted ranges overlap, it is not envisioned that the large and small aggregates used would be of approximately the same size. Rather, it is intended that the difference in particle size be appreciable, and at least on the order of 1:1.5, and preferably about a 2:1 ratio. These two different aggregate sizes may be mixed in proportions between about 1:1–1:10 small to large particles by weight. As may be envisioned, the small aggregate serves to fill the void areas between the large grit, in a manner similar to the small metal particles filling the interstices between the large aggregate in FIG. 8, reducing the size of any large passages through the first layer, thus increasing filtration of solids.

As a second example, the aggregate sizes may be characterized as large aggregate and very small aggregate, respectively. In this example the large aggregate may again have a size within the range of about 0.053–0.028" (1.35–0.70 mm, or 10–25 mesh), though the very small aggregate has a size in the range of about 0.0029–0.0014" (0.075–0.035 mm, or 200–400 mesh). With this example the two aggregate sizes may be mixed in a proportion between about 1:2–1:5 very small to large particles by weight.

In both of these examples the smaller sized aggregate at least partially fills, and reduces the size of, the interstitial spaces between the large aggregate, thus reducing the size of a solid object which may pass through the filter. However, this can also reduce the amount of interference between the first and second layers, as the smaller aggregate may block the metal particles from entering the interstices. By providing appropriate mixtures of aggregate sizes, and appropriate pressures, this problem can be reduced. Additionally, such a problem does not exist if the first and second layers are secured together using the thermal contraction method noted above.

A second arrangement for the first layer 48 is to provide the disparate aggregate sizes, yet in a more layered manner, similar to the layering between the first and second layers in FIG. 7. With this arrangement, the aggregate sizes are not uniformly mixed, but are kept separate. Each of the aggregate sizes is subjected to the forming process described above to form a green, but of a reduced thickness such that each green will form a sub-layer of the completed filter. These layers will of course extend in the direction of gas flow through the filter.

Once the green layers have been formed, they may be assembled together within a mold and pressed or compressed together to unite the greens. This may be facilitated by reducing the amount of pressure applied to initially form the individual green sub-layers, compared to a single forming step as described above, such that they may be further compacted during this second step. It is preferred that all sub-layers of the filter be assembled at the same time in this second compacting step, but an individual layer or layers may be pressed into position separately. This second pressing or compacting step forces the disparate layers together sufficiently that they will be secured together.

The pressing or compacting to form the unitary layer 48 will cause some amount of intermingling of aggregate sizes across the boundary between adjacent layers. This intermingling will produce a transition zone of mixed size grit, similar to the uniformly mixed aggregate sizes discussed above. This transition zone will thus have greatly reduced voids and passageways. As a result, the gas flow from the large aggregate sub-layer will be diffused before entering the smaller aggregate sub-layer(s) downstream. This will improve filtering, as a more even flow will be filtered by the smaller aggregate sub-layer(s).

As may be envisioned, the final form must fit within the inflator, and as such the thickness of the sub-layers depends upon such final size. The number of sub-layers, and their order, however, may be varied for best results in a particular application.

The benefits of using multiple aggregate sizes (intermingled or sub-layered) are not limited to the ceramic first layer. In particular, the metal particles for the sintered second layer may also be used in essentially identical manners as described above. The only differences would be the possible deletion of the binder, as metal particles may be forced into a green simply by application of sufficient pressure, if desired, and the temperatures required to sinter the green would be reduced to known metal sintering temperatures. All other factors, including particle sizes, and mixture percentages, are essentially identical.

The final forms described above may also be achieved in the plasma arc metal layer. Specifically, two different particle sizes may be fed to the torch to provide the fully intermingled layer. For the more defined layering, several passes may be deposited with a first particle size, and then further passes deposited with a different particle size. As may be envisioned, the plasma arc deposited particles will achieve a configuration similar to that for the sintered metal particles.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims. Specifically, the possible combinations between ceramic, metal and non-metal constituents are intended to be within the scope of this invention, even though not specifically enumerated in the interest of brevity.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A unitary filter for use with an inflator, comprising:
   a monolithic, reticulated, porous body constructed and arranged for use as a filter for gasses produced by a pyrotechnic inflator, said body including:
   a first layer formed of a porous ceramic, and;
   a second layer formed of an agglomeration of metal particles secured to each other and to said first layer, said second layer reinforcing said first layer and providing additional filtration.

2. A filter as in claim 1, wherein said porous ceramic first layer is formed from the group consisting of agglomerated ceramic particles, and reticulated ceramic foam, and wherein said metal particles of said second layer are secured to said first layer by the group consisting of sintering, mechanical interference, or plasma arc deposition.

3. A filter as in claim 2, wherein said first layer is an agglomeration of ceramic particles.

4. A filter as in claim 3, wherein said metal particles of said second layer are sintered to said first layer.

5. A filter as in claim 3, wherein said metal particles of said second layer are a separate unit secured to said first layer by mechanical interference resulting from said second layer being placed upon said first layer while in a heated condition and thereafter cooled.

6. A filter as in claim 3, wherein said metal particles of said second layer are secured to said first layer by plasma arc deposition.

7. A filter as in claim 2, wherein said first layer is a reticulated ceramic foam.

8. A filter as in claim 7, wherein said metal particles of said second layer are sintered to said first layer.

9. A filter as in claim 7, wherein said metal particles of said second layer are a separate unit secured to said first layer by mechanical interference resulting from said second layer being placed upon said first layer while in a heated condition and thereafter cooled.

10. A filter as in claim 7, wherein said metal particles of said second layer are secured to said first layer by plasma arc deposition.

11. A filter as in claim 2, wherein at least one of said first and second layers is formed of first particles having a large size and second particles having an appreciably smaller size.

12. A filter as in claim 11, wherein said second particles are small.

13. A filter as in claim 12, wherein said first and said second particles are uniformly distributed throughout said at least one of said first and second layers.

14. A filter as in claim 12, wherein said first particles form a first sublayer, and said second particles form a second sublayer, said first and said second sublayers being directly adjacent, and wherein said first particles and said second particles are intermingled at the intersection of said sublayers.

15. A filter as in claim 14, wherein each of said sublayers is formed as an individual element, and thereafter said individual elements are forced together to form said at least one of said first and second layers and cause said intermingling.

16. A filter as in claim 11, wherein said first size is large, being within the range of about 1.35–0.70 mm, and wherein said second size is very small, being within the range of about 0.075–0.035 mm.

17. A filter as in claim 16, wherein said first and said second particles are uniformly distributed throughout said at least one of said first and second layers.

18. A filter as in claim 16, wherein said first particles form a first sublayer, and said second particles form a second sublayer, said first and said second sublayers being directly adjacent, and wherein said first particles and said second particles are intermingled at the intersection of said sublayers.

19. A filter as in claim 18, wherein each of said sublayers is formed as an individual element, and thereafter said individual elements are forced together to form said at least one of said first and second layers and cause said intermingling.

* * * * *